(12) United States Patent
Earle et al.

(10) Patent No.: US 10,160,030 B2
(45) Date of Patent: *Dec. 25, 2018

(54) CASSETTE AND BICYCLE WHEEL ASSEMBLY

(71) Applicant: Praxis Works LLC, Santa Cruz, CA (US)

(72) Inventors: David M. Earle, Watsonville, CA (US); Ding-Jiun Lin, Taipei (TW)

(73) Assignee: Praxis Works LLC, Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/348,815

(22) Filed: Nov. 10, 2016

(65) Prior Publication Data

US 2017/0056955 A1 Mar. 2, 2017

Related U.S. Application Data

(63) Continuation of application No. 14/923,343, filed on Oct. 26, 2015, now abandoned, which is a
(Continued)

(51) Int. Cl.
| | |
|---|---|
| *B21D 53/86* | (2006.01) |
| *B60B 27/04* | (2006.01) |
| *B60B 1/00* | (2006.01) |
| *B60B 27/00* | (2006.01) |
| *B60B 27/02* | (2006.01) |
| *B60B 1/04* | (2006.01) |
| *B21D 53/28* | (2006.01) |
| *B62M 9/10* | (2006.01) |
| *B21D 53/26* | (2006.01) |

(Continued)

(52) U.S. Cl.
CPC ............ *B21D 53/86* (2013.01); *B21D 53/28* (2013.01); *B60B 1/003* (2013.01); *B60B 1/041* (2013.01); *B60B 1/042* (2013.01); *B60B 27/0026* (2013.01); *B60B 27/023* (2013.01); *B60B 27/047* (2013.01); *B62M 9/10* (2013.01); *B21D 53/26* (2013.01); *B23K 2101/00* (2018.08); *B60B 31/005* (2013.01); *Y10T 29/49462* (2015.01); *Y10T 29/49465* (2015.01); *Y10T 29/49481* (2015.01); *Y10T 29/49506* (2015.01)

(58) Field of Classification Search
CPC .......... B62M 9/10; B21D 53/86; B60B 27/04; B60B 31/005; Y10T 29/49506; Y10T 29/49481; Y10T 29/49465; Y10T 29/49462
See application file for complete search history.

(56) References Cited

U.S. PATENT DOCUMENTS

| | | |
|---|---|---|
| 452,480 A | 5/1891 | Lambert |
| 4,866,831 A | 9/1989 | Lanzerath et al. |

(Continued)

*Primary Examiner* — Jason R Bellinger
(74) *Attorney, Agent, or Firm* — Kolisch Hartwell, P.C.

(57) ABSTRACT

A cassette for a bicycle may include a plurality of sprocket portions joined together into a single unit. The cassette may include a cavity formed in the large end of the cassette. A related manufacturing method may include joining a first generally planar sprocket portion having a plurality of connector portions extending transverse to the plane of the first sprocket portion, to a second generally planar sprocket portion, e.g., by fusing at least one of the connector portions to the second sprocket portion.

18 Claims, 16 Drawing Sheets

Related U.S. Application Data continuation-in-part of application No. 14/660,856, filed on Mar. 17, 2015, now Pat. No. 9,168,976.

(51) Int. Cl.
  *B60B 31/00* (2006.01)
  *B23K 101/00* (2006.01)

(56) References Cited

U.S. PATENT DOCUMENTS

| | | | |
|---|---|---|---|
| 5,503,600 | A | 4/1996 | Berecz |
| 5,954,604 | A | 9/1999 | Nakamura |
| 6,176,798 | B1 | 1/2001 | Nakamura |
| 6,382,381 | B1 | 5/2002 | Okajima et al. |
| 7,931,553 | B2 | 4/2011 | Tokuyama |
| 7,959,529 | B2 | 6/2011 | Braedt |
| 8,342,994 | B2 | 1/2013 | Braedt |
| 8,360,911 | B2 | 1/2013 | Braedt |
| 9,168,976 | B1 * | 10/2015 | Earle .................. B23K 35/0255 |
| 2002/0074853 | A1 | 6/2002 | Krampera |
| 2003/0064844 | A1 | 4/2003 | Lin |
| 2005/0272546 | A1 | 12/2005 | Reiter |
| 2008/0188336 | A1 | 8/2008 | Tokuyama |
| 2010/0099530 | A1 | 4/2010 | Chiang et al. |
| 2011/0105263 | A1 | 5/2011 | Braedt |
| 2012/0302384 | A1 | 11/2012 | Braedt |
| 2013/0017914 | A1 | 1/2013 | Braedt |
| 2013/0199044 | A1 | 8/2013 | Hodjat |
| 2014/0179474 | A1 | 6/2014 | Florczyk et al. |
| 2016/0272002 | A1 * | 9/2016 | Earle ..................... B60B 27/047 |

* cited by examiner

CASSETTE AND BICYCLE WHEEL ASSEMBLY

CROSS-REFERENCE TO RELATED APPLICATIONS

The present application is a continuation of U.S. patent application Ser. No. 14/923,343, filed Oct. 26, 2015, now abandoned, which is a continuation-in-part of U.S. patent application Ser. No. 14/660,856, filed Mar. 17, 2015, now U.S. Pat. No. 9,168,976, issued Oct. 27, 2015, each of which is hereby incorporated by reference herein for all purposes.

FIELD

This disclosure relates to bicycles and bicycle manufacturing. More specifically, the disclosed embodiments relate to systems and methods relating to sprocket clusters and associated rear wheels for bicycles.

INTRODUCTION

A typical bicycle drive train includes two pedals attached to respective crankarms on opposite sides of the bicycle frame. The crankarms are typically joined together by a spindle that passes through the frame, rigidly attaching the crankarms at positions that are rotated by 180 degrees relative to each other. This allows the alternating pedaling motion with which all bicycle riders are familiar. The pedals are also rotationally coupled to a toothed gear or set of gears, commonly referred to as the chainring or drive wheel. The chainring, in turn, drives a sprocket on the rear wheel of the bicycle via a continuous chain looped around the chainring and sprocket. Typically, a rider may select from a plurality of rear sprockets of different sizes, depending on factors such as riding conditions, rider comfort, and desired speed. The plurality of rear sprockets are arranged in a stepped or stacked formation by size, coaxial with the rear wheel hub. The sprockets are traditionally attached to the hub in a freehub or a freewheel arrangement. In either standard arrangement, each sprocket is connected or coupled to the hub individually, such as by a splined connection.

SUMMARY

The present disclosure provides a method for making a cassette for a bicycle. In some embodiments, a method may include: forming a generally planar and annular first sprocket portion defining a plane; forming a plurality of connector portions around a first inner diameter (ID) of the first sprocket portion, each of the connector portions being formed of a single piece with the first sprocket portion and extending transverse to the plane of the first sprocket portion; and joining the first sprocket portion to a second generally planar sprocket portion by affixing at least one of the connector portions to the second sprocket portion; wherein the second sprocket portion is generally annular and has a second ID sized differently from the first ID.

In some embodiments, a method for making a cassette for a bicycle may include: producing a substantially planar first sprocket portion defining a plane and having a generally annular shape, a first plurality of teeth extending radially outward around a first outer diameter, and a first plurality of connector portions protruding transverse to the plane of the first sprocket portion around an inner diameter, wherein the first sprocket portion and the first plurality of connector portions are a formed as a single piece; producing a substantially planar second sprocket portion having a second plurality of teeth extending radially outward around a second outer diameter; and joining the first sprocket portion to the second sprocket portion by affixing the plurality of connector portions to the second sprocket portion; wherein the first sprocket portion and the second sprocket portion are concentric, and the first sprocket portion is spaced from the second sprocket by the plurality of connector portions.

In some embodiments, a method for making a cassette for a bicycle may include: selecting a substantially planar and annular first sprocket portion defining a plane, the first sprocket portion having a first outer diameter, and a first plurality of connection members disposed around an inner diameter, the first sprocket portion and the first plurality of connection members formed as a single piece, each connection member protruding transverse to the plane of the sprocket portion; selecting a substantially planar second sprocket portion having a second outer diameter different from the first outer diameter; aligning the first and second sprocket portions coaxially; and joining the first and second sprocket portions by welding the first connection members of the first sprocket portion to the second sprocket portion.

Features, functions, and advantages may be achieved independently in various embodiments of the present disclosure, or may be combined in yet other embodiments, further details of which can be seen with reference to the following description and drawings.

DESCRIPTION

Overview

Various embodiments of devices and methods relating to a bicycle wheel assembly having a unitary (or partially unitary) cassette and improved spoke spread angle are described below and illustrated in the associated drawings. Unless otherwise specified, the methods, bicycle wheel assembly, and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other wheel assemblies and/or methods. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Figure 1:
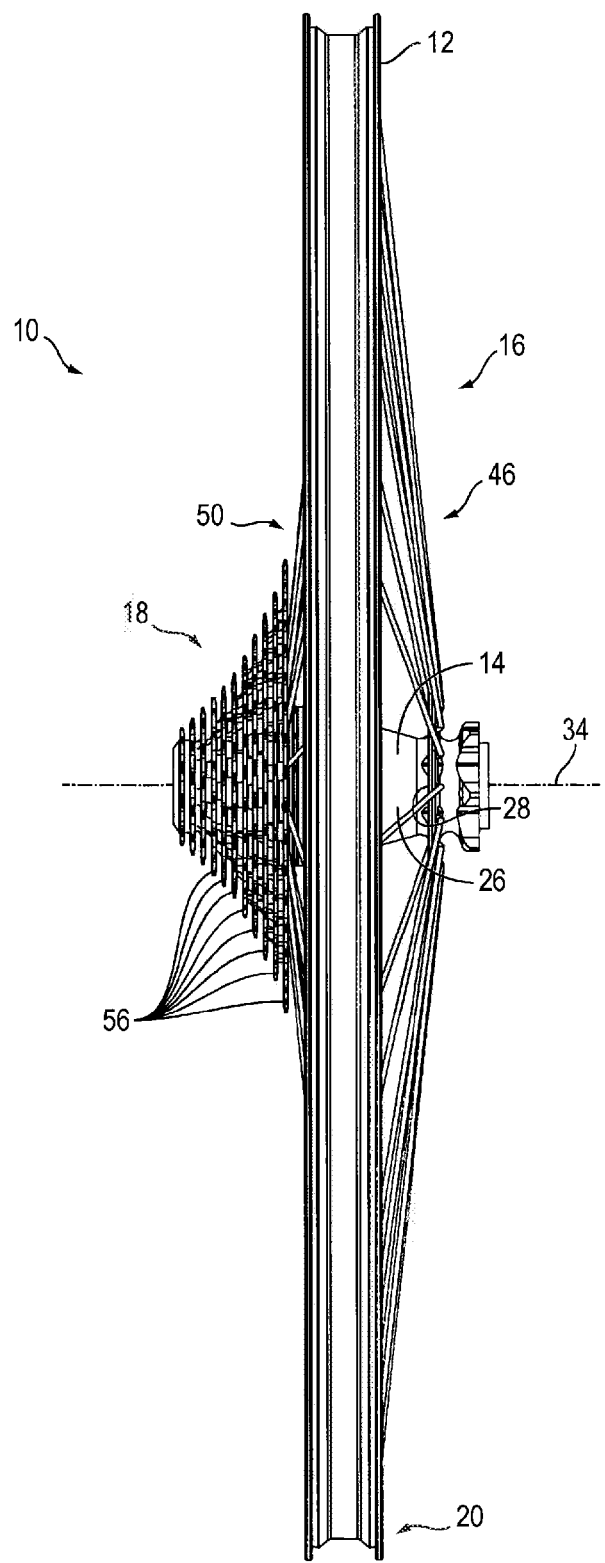
FIG. 1 is a front elevation view of an illustrative bicycle wheel assembly in accordance with aspects of the present disclosure.
Figure 2:
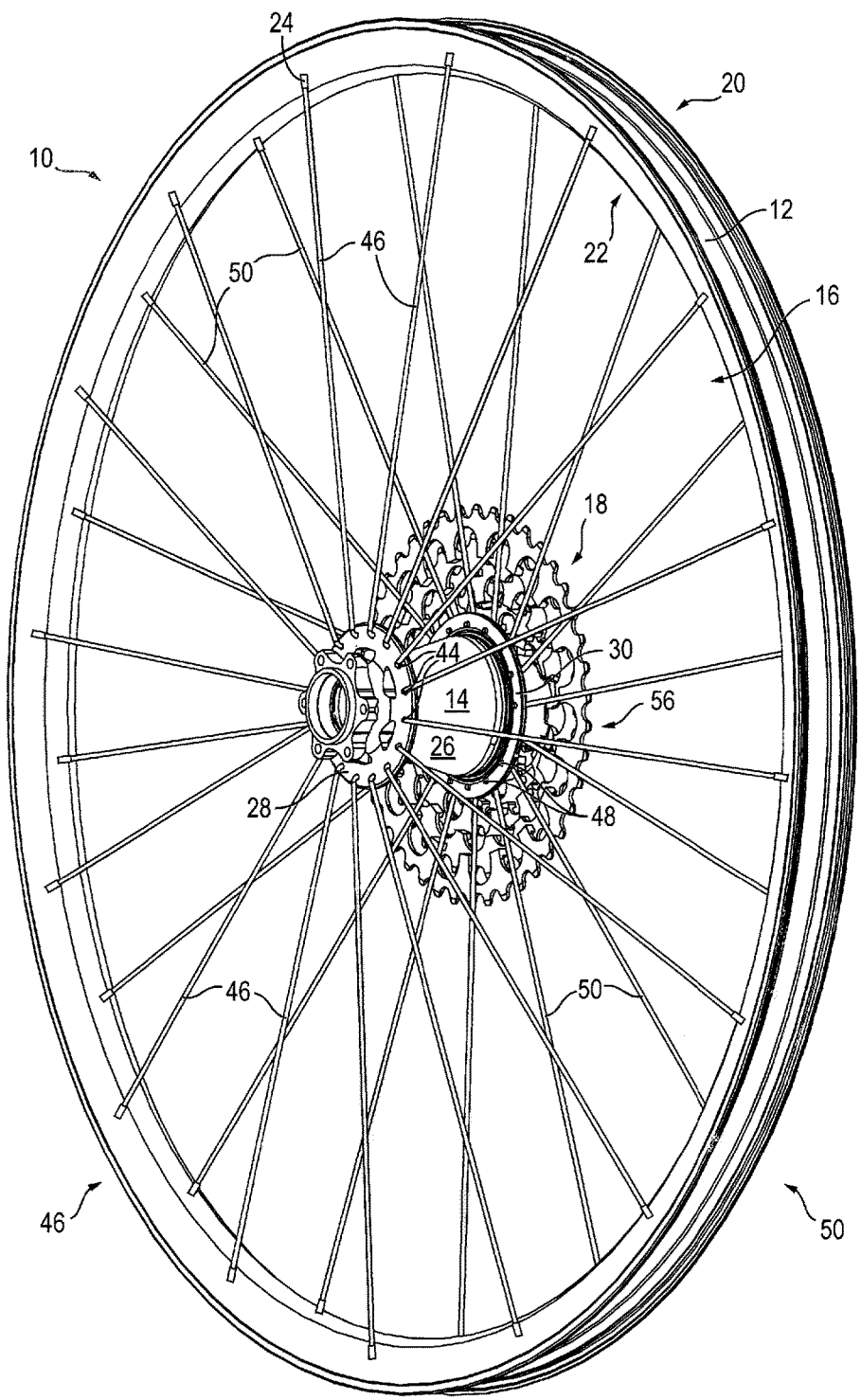
FIG. 2 is a left side isometric view of the assembly of FIG. 1.

A bicycle wheel assembly (e.g., a rear wheel assembly) may include a rim, a central hub, several spokes connecting the rim to the hub, and a cogset or gear cluster coupled to one end portion of the hub (e.g., a freehub). An illustrative wheel assembly is shown in FIGS. 1 and 2, and described in detail in the examples below. Cogsets may be interchangeably referred to herein as cassettes, sprocket clusters, and/or gear clusters. A cassette may include a plurality of sprockets (also referred to as gears and/or cogs), each of the sprockets having a different outer diameter and/or number of teeth. The sprockets may be arranged coaxially by size, with a largest sprocket on an inboard end of the cassette, and a smallest sprocket on an outboard end of the cassette. One or more of the sprockets may be rotationally coupled to the hub, such as by a splined connection to an axial projection of the hub.

The cassette makes up a portion of a typical bicycle drive train, and the drive chain of the bicycle drives the wheel through a selected sprocket of the cassette. While a chain drive and toothed sprocket cluster are described herein, it should be understood that other drive mechanisms may be used, such as a belt drive.

Typically, to allow each of the sprockets to transfer chain motion into wheel revolution, each of the sprockets must be individually splined or otherwise attached to the hub. However, the improved wheel assembly described in detail below includes a cassette wherein two or more of the sprockets are affixed to each other, thereby enabling the unconnected (e.g., unsplined) sprockets to drive the wheel via the connected (e.g., splined) sprockets. In some examples, some or all of the sprockets are affixed to each other, and one or two of the smaller sprockets are connected (e.g., splined) to the hub. In some examples, the largest sprocket is affixed to the next largest sprocket, such that the largest sprocket is not required to connect directly to the hub. The sprockets may be axially spaced and affixed to each other by welding or otherwise attaching radially distributed projections of one sprocket to the face of a neighboring sprocket. Accordingly, the unitary portion of the cassette may be described as a series of coaxial sprockets affixed to each other.

This arrangement and method of manufacture facilitates use of one or more sprockets that are not required to interface directly with the hub. Accordingly, these unconnected (e.g., unsplined) sprockets can have an annular shape with an inner diameter larger than the hub. In some examples, each successively larger sprocket may have a successively larger inner diameter, resulting in a roughly cone-shaped cavity in the center of the cassette. This cavity may result in a lower weight of the cassette, as unneeded material is no longer present in a center portion of the cogset.

Additionally, the largest sprocket need not be coupled directly to the hub, so an opening or mouth of the cavity may be present in the large end of the cassette. In some examples, a similar cavity may be provided by a largest sprocket that is concave rather than annular, as described further below. As this cavity mouth is also the area of the wheel assembly where the cassette-side spokes attach to a flange (or other suitable portion) of the hub, the flange may be moved outward from its typical position, toward or even into the interior of the cassette. Spokes may pass from the rim to the cassette-side flange, breaking the plane of the innermost, largest sprocket. As compared to a standard cassette, or any cassette having an innermost sprocket or other component that connects to the hub, this open-mouthed cassette may permit a more advantageous wheel geometry. For example, the cassette-side spokes may form a more acute angle with the hub axis. For example, the spread between the flanges of the hub may be widened. A wider angle of the spokes, as measured at the rim, may improve wheel stiffness and lateral performance. In some examples, the same spread between flanges may be maintained, but the dish of the wheel may be lessened, such as by shifting the flanges toward the cassette.

As described in further detail below, a method of manufacturing the wheel assembly may include steps to manufacture all or a portion of the cassette. For example, two sprockets intended to be side by side in the cassette may be stamped and shaped. At least one of the stamped sprockets may include finger portions that extend radially inward. These finger portions may be reshaped to protrude transverse to the plane of the sprocket (e.g., orthogonally). The sprockets may then be attached to each other by welding the transverse finger portions (also referred to as "ears") to the face of the other sprocket. Any suitable connection method may be used instead of or in combination with welding, such as bolting, keying, adhering, and/or the like. Additional sprockets may be attached to the two-sprocket intermediate article of manufacture, by repeating the steps substantially as described above and in further detail below.

Examples, Components, and Alternatives

The following examples describe selected aspects and components of exemplary bicycle wheel assemblies as well as related systems and/or methods. These examples are intended for illustration and should not be interpreted as limiting the entire scope of the present disclosure. Each example may include one or more distinct inventions, and/or contextual or related information, function, and/or structure.

Illustrative Wheel Assembly:

As shown in FIGS. 1-5, this section describes an illustrative bicycle wheel assembly having a hollow or partially hollow cassette and a spoke arrangement that extends into the cassette.

Figure 3:
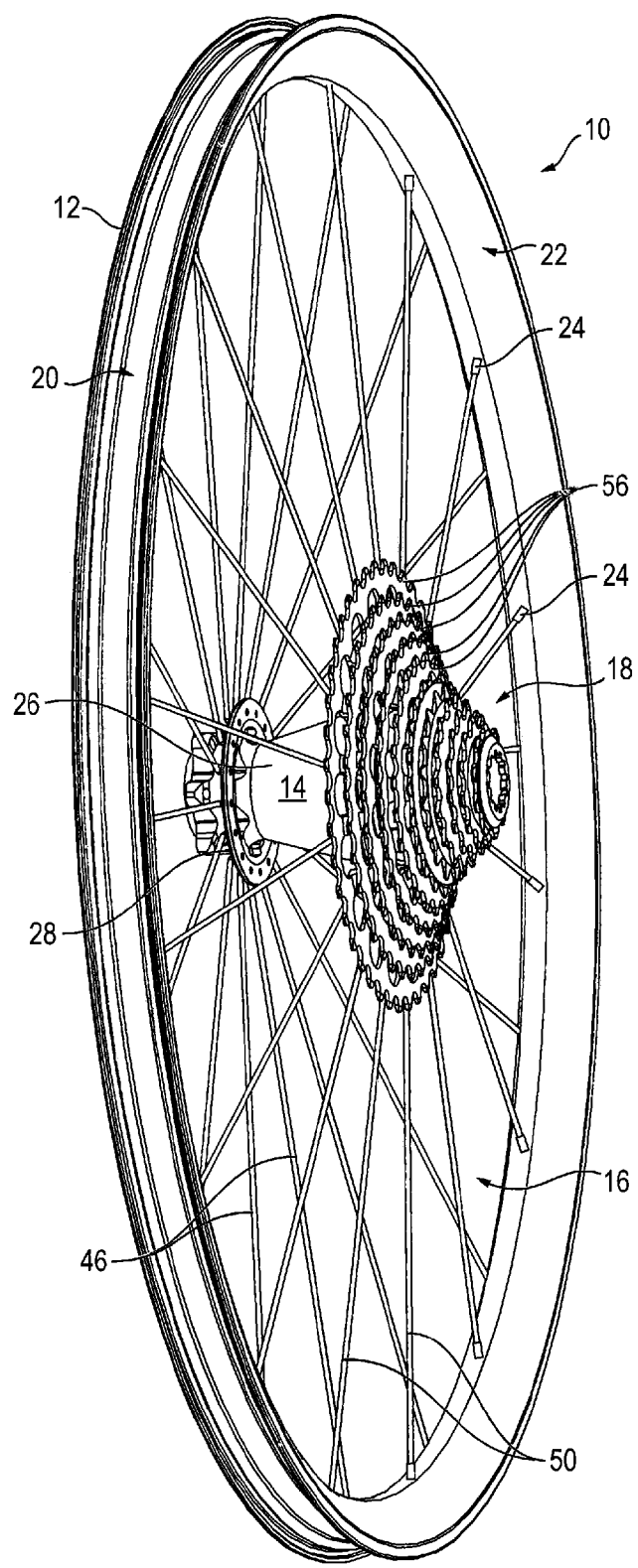
FIG. 3 is a right side isometric view of the assembly of FIG. 1.

In this example, a bicycle wheel assembly is generally indicated at 10. Assembly 10 includes a circular rim 12 coupled to a central hub 14 by a plurality of spokes 16. A cassette 18 is coupled to hub 14 on one side of the assembly. Cassette 18 is configured to comprise a portion of the drive train of a bicycle on which the wheel assembly is mounted. Bicycle drive trains are typically on the right side of the bicycle. It is noted that other configurations of the various components are possible, such as when assembly 10 is used on certain examples of recumbent bicycles and the like. However, it will be assumed for ease of description herein that assembly 10 corresponds to the rear wheel in a typical bicycle configuration. Accordingly, FIG. 1 shows a front elevation view of assembly 10 (i.e., as seen from the front of a bicycle, looking rearward). Similarly, FIGS. 2 and 3 are left and right isometric views, respectively.

Rim 12 may include any suitable wheel rim configured to hold a tire on an outer circumferential portion 20 and to function as a connection surface for spokes 16 on an inner circumferential portion 22. Spokes 16 may be connected to rim portion 22 using any suitable method and/or device. For example, spokes 16 may be attached to rim portion 22 using spoke nipples 24 commonly used in the art. Any suitable number of spokes may be used, such as twenty-four or thirty-six spokes. Additionally or alternatively, rim 12 may be coupled to hub 14 by components other than spokes. For example, wheel assembly 10 may include a disc wheel or an aerodynamic spoked wheel (e.g., a tri-spoke). Rim 12 may be constructed of any suitable materials. For example, rim 12 may comprise aluminum or steel, alloys thereof, carbon fiber, and/or the like.

Hub 14 may include any suitable structure configured to couple a central axle to wheel assembly 10 and to provide a connection or mounting surface for spokes 16 and cassette 18. In the example shown in FIGS. 1-4, Hub 14 includes a body portion 26, a left hub flange 28, a right hub flange 30, and a splined portion 32 extending from hub 14 on the cassette side of the assembly (e.g., adjacent to the right hub flange). Right hub flange 30 may alternatively be referred to as the cassette-side flange. Hub 14 is shown in the drawings as a hub shell, in that the standard central axle is not illustrated. Splined portion 32 is referred to as "splined." However, portion 32 may include any suitable torque transfer structure configured to rotationally couple portion 32 to the cassette.

Hub 14 has a central axis 34 about which the hub and wheel rotate. Hub 14 may define a flange-to-flange width 36 between flanges 28 and 30. Hub 14 may have an overall hub width 38, defined axially between a first (i.e., left) terminal end 40 and a second (i.e., right) terminal end 42.

Left hub flange 28 may include spoke attachment points distributed around the hub flange, such as spoke holes 44. Spoke holes 44 are configured to receive a quantity of spokes 46, which are a subset of spokes 16. Likewise, right hub flange 30 may include spoke attachment points distributed around the hub flange, such as spoke holes 48. Spoke holes 48 are configured to receive a quantity of spokes 50, which are also a subset of spokes 16. Spokes 46 may be referred to interchangeably as left side spokes or left spokes. Similarly, spokes 50 may be referred to interchangeably as right side spokes, right spokes, or cassette-side spokes.

In the example shown, Rim 12 may be substantially centered with respect to the overall hub width 38. This results in the wheel being centered with respect to the bicycle frame and rear fork. However, as best seen in the sectional view of FIG. 4, rim 12 is not centered with respect to hub flange width 36. Flanges 28 and 30 are not symmetrical relative to the rim, and right side flange 30 is closer to an overall centerline 52 than left side flange 28. This is required to make room for the sprocket cluster (i.e., cassette 18). Because left spokes 46 are attached to left flange 28, and right spokes 50 are attached to right flange 30, the spokes on the left side of the wheel assembly form a deeper overall cone shape than the angle of the spokes on the right side. The spokes on the right side form a shallower or flatter cone. This aspect of the wheel, in which the rear wheel is centered relative to the bicycle frame, is referred to as dishing or the dish.

Given a constant rim diameter, an angle 54 of right side spokes 50 with respect to axis 34 is limited by the location of holes 48 in right flange 30, which is limited axially by cassette 18 and radially by the diameter of the flange or the radial distance of the flange from axis 34. It may be desirable for angle 54 to be more acute (i.e., closer to the angle formed by the left side spokes), because the more acute angle may improve lateral wheel stiffness. Accordingly, flange 30 may be moved farther from axis 34, such as by increasing the diameter of flange 30 and/or by increasing the diameter of hub body 26 to move flange 30 closer to the rim. Additionally or alternatively, angle 54 may be made more acute by locating flange 30 closer to right terminal hub end 42, i.e., toward cassette 18.

Figure 4:
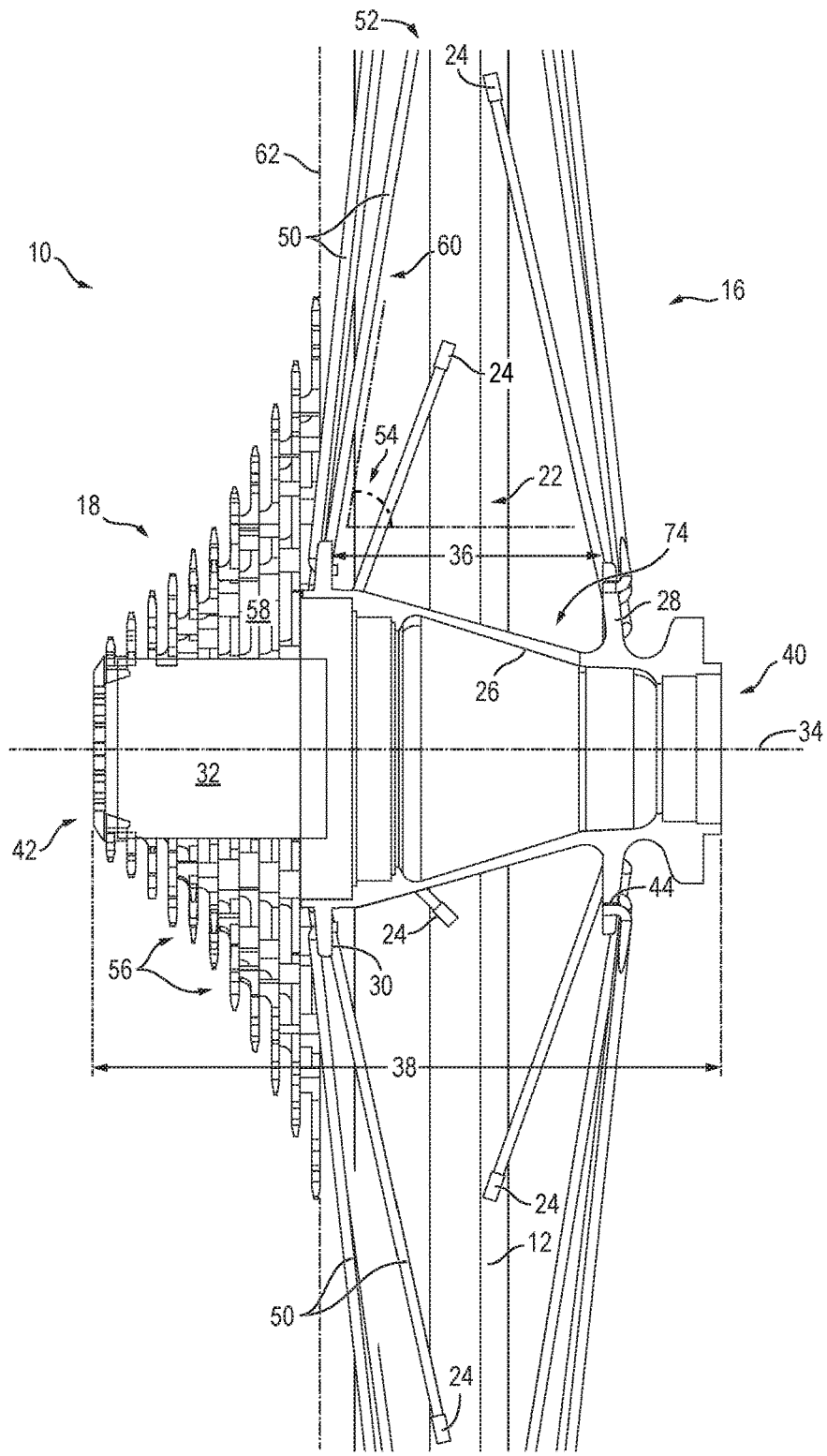
FIG. 4 is a partial sectional front elevation view of the assembly of FIG. 1.
Figure 5:
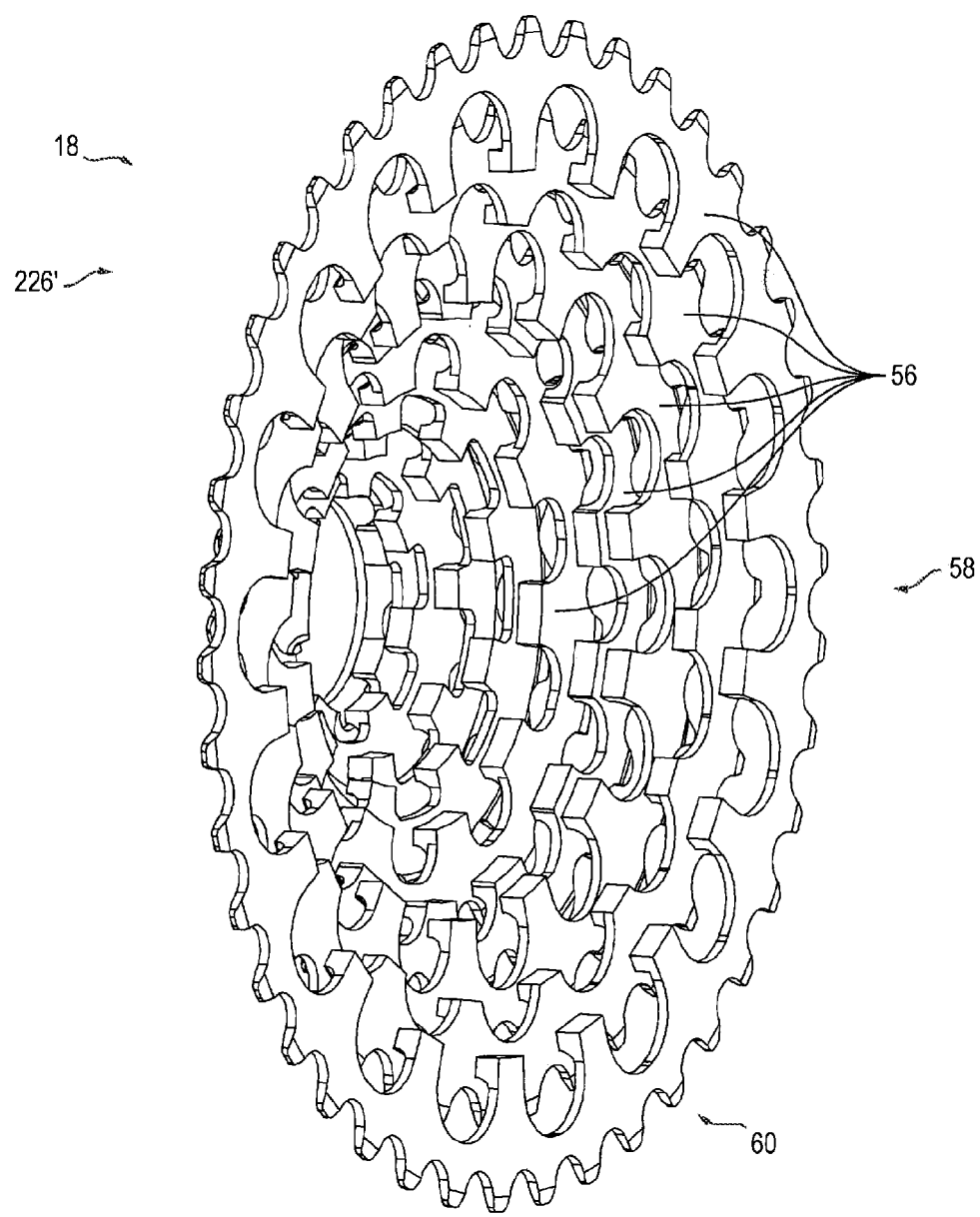
FIG. 5 is an isometric view of an illustrative sprocket cluster in accordance with aspects of the present disclosure.

With continuing reference to FIGS. 1-4, and specifically to the more detailed view of FIG. 5, cassette 18 may include any suitable number of sprocket portions 56 arranged coaxially and in an ascending order by size (e.g., diameter). This arrangement may also be referred to as a "stepped" arrangement of the sprocket portions. At least a portion of cassette 18 may be unitary, such that some or all of sprocket portions 56 form a single, undivided piece. In this regard, cassette 18 (or the unitary portion of cassette 18) may also be referred to as an inseparable unit, in the sense that separation of the sprocket portions can only be achieved through destructive methods such as cutting or breaking. For example, each sprocket portion may be permanently affixed to a neighboring sprocket portion. Permanently affixing or joining the sprocket portions may be achieved by fusing the sprocket portions to each other. For example, two sprocket portions may be fused by causing the portions, at least in part, to coalesce (e.g., by welding).

Each sprocket portion may include any suitable structure configured to provide a drive train interface (e.g., sprocket teeth configured to interface with a bicycle chain) and a sprocket-to-sprocket interface configured to provide an attachment and spacing mechanism between sprocket portions (e.g., protrusions fused to a neighboring sprocket portion).

This unitary set of sprocket portions facilitates the inclusion of an opening or cavity 58 in a large end 60 of cassette 18. Instead of individual sprockets, each of which must interface with splined portion 32 of the hub, only one (or a subset) of the sprocket portions of cassette 18 needs to interface with the hub to transmit force between the cassette and the hub. Sprocket portions that connect to the hub may be described as having a central aperture that is configured to mate with portion 32 (e.g., a splined freehub). This frees one or more of the larger sprocket portions to be formed as annular disks having an inner radius continuously larger than the hub. In some examples, only the largest sprocket portion is formed in this manner. Cavity 58 extends into the large end of the cassette until reaching the first sprocket portion that connects to the hub. Accordingly, in examples where only the largest sprocket portion is annular, cavity 58 may be described as having a depth of one sprocket. In other examples, a plurality of the largest sprocket portions are formed as annular disks. Moreover, the larger the sprocket portion outer radius, the larger the inner radius may be. The axially-growing inner radii of the sprocket portions may thereby form a roughly conical cavity 58 within cassette 18.

In some examples, cassette 18 may be unitary, and additional sprocket portions may be coupled to the same splined portion 32. For example, one or more smaller standard sprockets may be splined to the hub adjacent to cassette 18. Cassette 18 and/or additional sprockets may be held axially to the hub by a threaded keeper or any suitable structure or device configured to prevent cassette 18 from axially detaching from the hub.

As mentioned above, angle 54 may be made more acute by locating flange 30 farther outboard, i.e., closer to right terminal hub end 42. Cavity 58 facilitates relocation of right flange 30 beyond what is possible with standard cassettes, and beyond what is possible with any sprocket cluster that interfaces with hub 14 at the largest/inboard end of the cluster. In other words, hub flange 30 and/or a portion of right spokes 50 may be located at least partially inside cavity 58, i.e., outboard of a plane 62 defined by the inboard face of the large end of cassette 18. Outboard is defined herein as a direction away from lateral centerline 52 of the wheel assembly, whereas inboard is defined as a direction toward lateral centerline 52.

Illustrative Manufacturing Method and Intermediate Articles of Manufacture:

This section describes a method 100 for manufacturing a cassette suitable for use with a wheel assembly such as wheel assembly 10. This section also describes various intermediate articles of manufacture associated with method 100 and cassette 18; see FIGS. 5-11.

In general, this section describes a method for making a cassette (or portion of a cassette) for a bicycle. The method includes joining a first generally planar sprocket portion to a second generally planar sprocket portion. The first sprocket portion has a plurality of connector portions each unitary with the first sprocket portion and extending transverse to the plane of the first sprocket portion. The two sprocket portions are joined by fusing at least one of the connector portions to the second sprocket portion. The first sprocket portion is generally annular and has a first inner diameter (ID) and the second sprocket portion is generally annular and has a second ID sized differently from the first ID.

In some embodiments, the method includes producing a substantially planar first sprocket portion having a generally annular shape, a first plurality of teeth extending radially outward around a first outer diameter (i.e., outer circumference), and a first plurality of finger portions extending radially inward around an inner diameter (i.e., inner circumference). The method may further include producing a substantially planar second sprocket portion having a second plurality of teeth extending radially outward around a second outer diameter. The first plurality of finger portions may be shaped to produce a plurality of connector portions protruding transverse to the plane of the first sprocket portion. The first sprocket portion may be joined to the second sprocket portion by fusing the plurality of connector portions to the second sprocket portion. The first sprocket portion and the second sprocket portion may be coaxial, and the first sprocket portion may be spaced from the second sprocket by the plurality of connector portions.

In some embodiments, the method may include selecting a substantially planar and annular first sprocket portion having a first outer diameter, and a plurality of connection members protruding transverse to the plane of the sprocket portion. A substantially planar second sprocket portion having a second outer diameter different from the first outer diameter may also be selected. The first and second sprocket portions may be aligned coaxially. The first and second sprocket portions may be joined, such as by fusing (e.g., coalescing or welding) the connection members of the first sprocket portion to the second sprocket portion.

Figure 6:
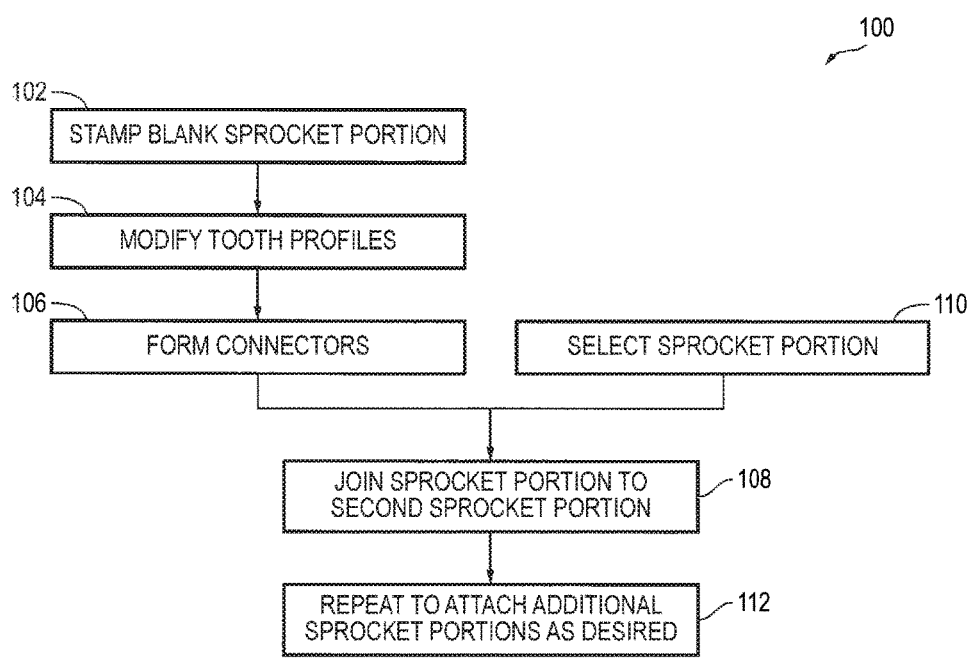
FIG. 6 is a block diagram showing steps performed in an illustrative method for manufacturing a sprocket cluster in accordance with aspects of the present disclosure.

FIG. 5 is an example of a unitary, hollow cassette 18, as described above. FIG. 6 is a flowchart illustrating steps performed in an illustrative method for manufacturing a cassette (e.g., cassette 18), and may not recite the complete process or all steps of the process. Although various steps of method 100 are described below and depicted in FIG. 6, the steps need not necessarily all be performed, and in some cases may be performed in a different order than the order shown. FIGS. 7 through 11 depict intermediate articles of manufacture associated with method 100 and/or cassette 18, all as further described below.

At step 102, an individual sprocket portion 200 (corresponding to one sprocket portion of sprocket portions 56) is created, e.g., by cutting and/or stamping the sprocket portion from a flat plate or sheet of steel or other suitable metal. Step 102 may be repeated any number of times. For example, multiple copies of substantially identical sprocket portions may be created. For example, multiple different sprocket portions may be created, such as sprocket portions having different sizes and/or tooth counts. For simplicity, only one sprocket portion 200 is described with respect to step 102. At this step, sprocket portion 200 may be substantially planar, and may be referred to as a "blank" 202.

Figure 7:
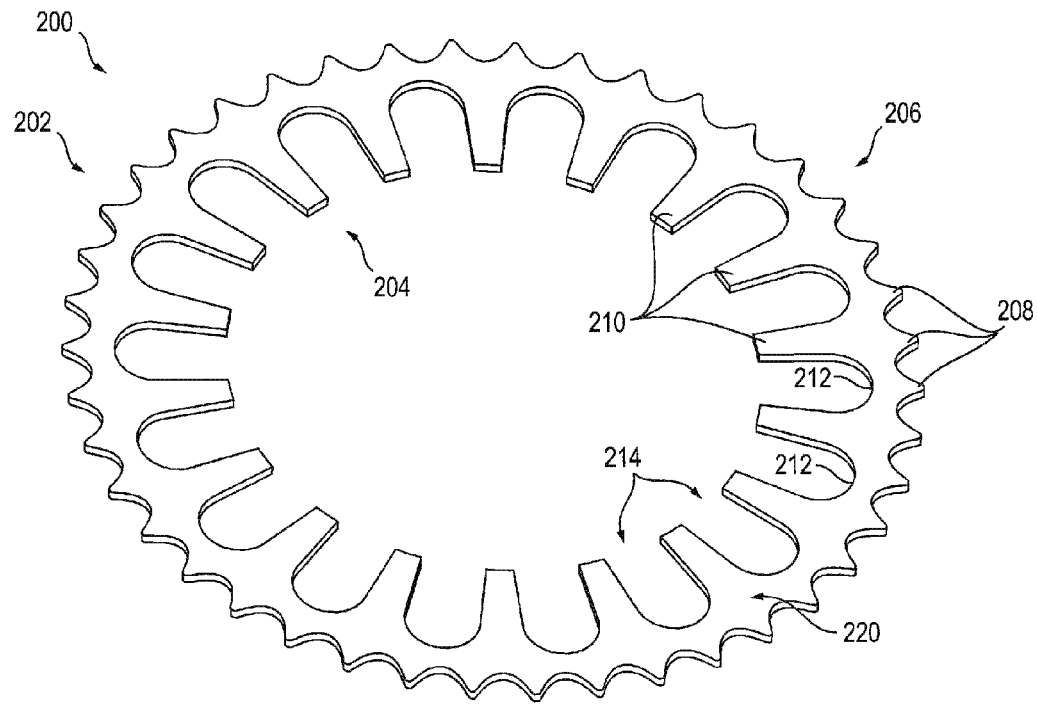
FIG. 7 is an isometric view of an illustrative intermediate article of manufacture resulting from a step of the method shown in FIG. 6.

As shown in FIG. 7, sprocket portion 200 in the form of blank 202 includes a generally annular plate having an inner diameter (ID) 204, an outer diameter (OD) 206, and a generally constant thickness. In this context, and as commonly used in the art, the terms ID and OD each describe both a respective diameter and a respective perimeter (e.g., circumference) of the object. For example, OD may refer interchangeably to both the diametrical size and the circumferential edge portion of the outer circle defined by blank 202.

A plurality of teeth 208 are spaced or disposed around OD 206. Teeth 208 may include any suitable structure configured to interface with a bicycle drive train (e.g., a bicycle chain), thereby enabling sprocket portion 200 to function as a drive gear for the rear wheel. For example, as shown in FIG. 7, teeth 208 may be generally triangular and spaced to correspond with standard bicycle chain links. Different sizes of sprocket portion 200 may include different numbers of teeth 208, to accommodate desired gearing for the wheel assembly. At step 102, teeth 208 may be in an unfinished state.

A plurality of finger portions 210 are spaced or disposed around ID 204. Finger portions 210 on blank 202 may include any suitable structure capable of being stamped or cut from a flat plate and then shaped into a connection member for attaching sprocket portion 200 to another sprocket portion. For example, as shown in FIG. 7, finger portions 210 may include a plurality of elongate members projecting radially inward, i.e., toward the center of blank 202. A radius 212 may be formed at the proximal ends (i.e., bases) of the members, such that the finger portions are defined and separated by U-shaped gaps 214.

Step 102 may be summarized as stamping or cutting to create a blank having a perimeter or profile that includes inner shapes and outer teeth. After step 102, the gear or sprocket portion is a flat plate having an inner and outer shape. Step 102 may be summarized as producing a substantially planar first sprocket portion having a generally annular shape, a first plurality of teeth extending radially outward around a first outer diameter, and a first plurality of finger portions extending radially inward around an inner diameter.

Figure 8:
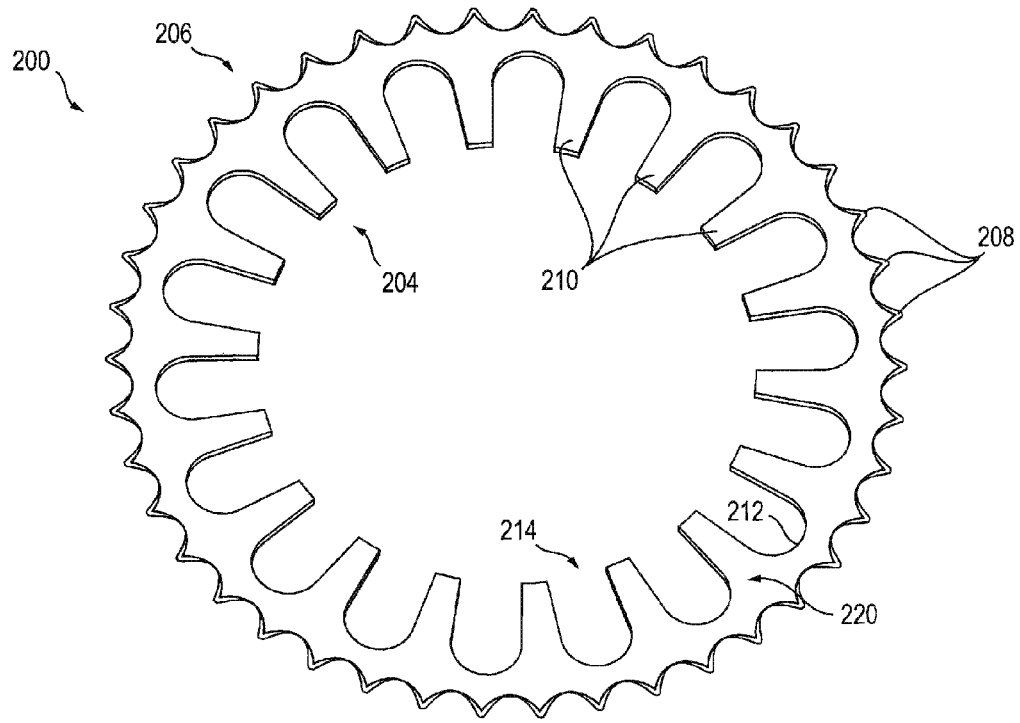
FIG. 8 is an isometric view of another illustrative intermediate article of manufacture from a step of the method shown in FIG. 6.
Figure 9:
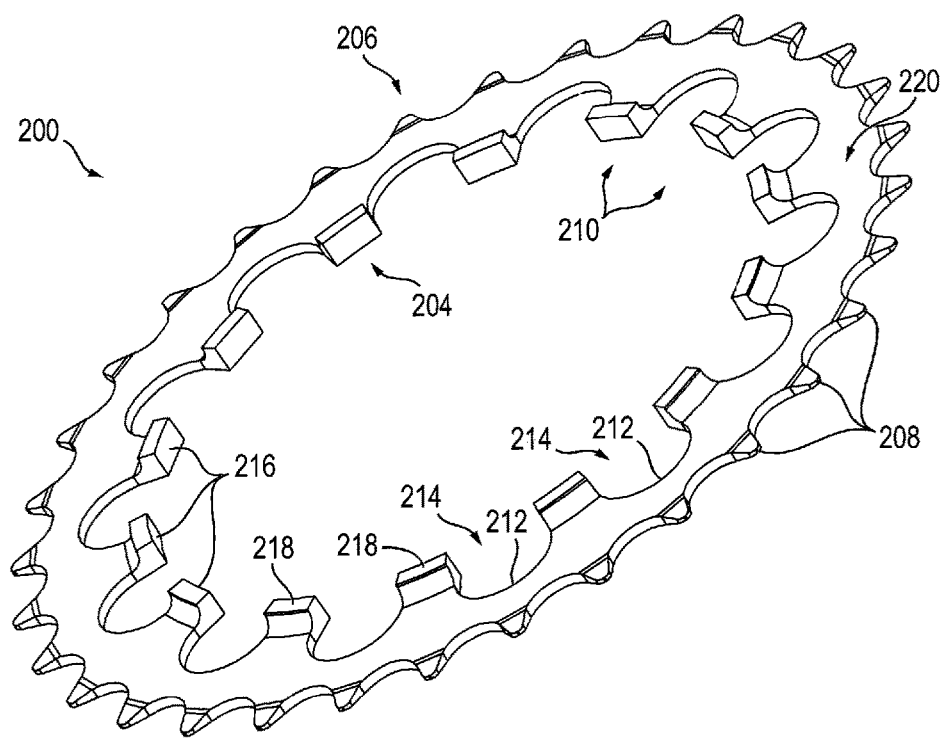
FIG. 9 is an isometric view of another illustrative intermediate article of manufacture from a step of the method shown in FIG. 6.
Figure 10:
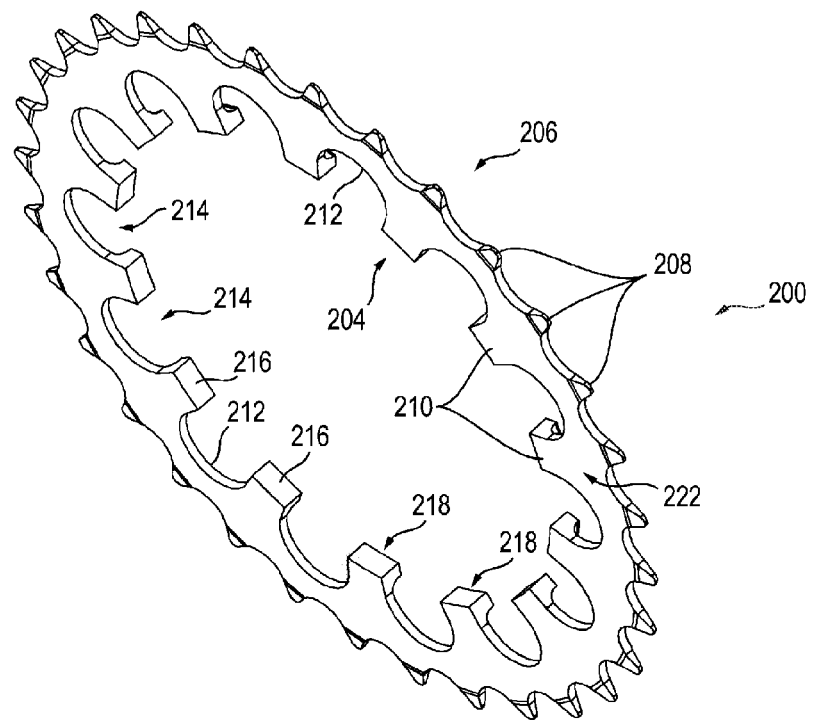
FIG. 10 is an alternate isometric view of the article of FIG. 9.

At step 104, teeth 208 may be modified to change the sectional profile of one or more of the teeth. In general, the profile(s) may be modified to facilitate better chain engagement, better chain disengagement, and/or other shifting characteristics. Modification of the tooth profile(s) may be accomplished by forging, cutting, chamfering, beveling, smoothing, filing, grinding, any combination of these, and/or the like. Following completion of step 104, teeth 208 of sprocket portion 200 may be partially tapered or chamfered as shown in FIG. 8. Step 104 may be described as creating shifting profiles on teeth 208, such as by making small cuts and chamfers on the individual teeth to facilitate smooth shifting.

Depending on the method used to create the profiles, step 104 may include trimming of excess material and/or cleaning or refining of the profile. For example, chamfering the teeth using a forging method may result in some unnecessary material being squeezed out. This excess material may be trimmed off and cleaned up. In some examples, this trimming operation may be performed in parallel with other operations, such as those described below.

In some embodiments, step 104 may be summarized as forming or creating a profile on each of a plurality of teeth, which may include forging and/or trimming each tooth.

At step 106, finger portions 210 may be modified to form connector portions 216 that extend transverse to the plane of sprocket portion 200. Connector portions 216 may include any suitable structure that is unitary with sprocket portion 200 and protrudes transverse (e.g., orthogonal) to the plane of the sprocket portion. For example, finger portions 210 may be modified by bending, forming, shaping, forging, pressing, any combination of these, and/or the like. Modification results in at least a distal end of each finger being reoriented to extend transverse to the plane of sprocket portion 200. In some examples, such as the one shown in FIGS. 9 and 10, each of the finger portions may be modified in a substantially identical fashion, such that all of the transverse connector portions 216 extend in the same direction.

Sprocket portion 200 may have a first major face 220 and a second major face 222 opposite and spaced from first major face 220. Connector portions 216 may be sized to correspond with a desired spacing between sprocket portions. For example, connector portions 216 may protrude from major face 220 of sprocket portion 200 by a distance corresponding to the desired lateral spacing between sprocket portions. A terminal end 218 of each connector portion 216 may be shaped to interface with a neighboring sprocket portion. For example, the face of terminal end 218 may be flat to interface with a neighboring sprocket portion that is expected to be planar.

In some embodiments, step 106 may be summarized as shaping a plurality of finger portions to produce a plurality of connector portions protruding transverse to the plane of the sprocket portion. The connector portions may be disposed around the ID of the sprocket portion. In some embodiments, step 106 may include modifying a corresponding plurality of elongate members of the sprocket portion to form the plurality of connector portions.

Figure 11:
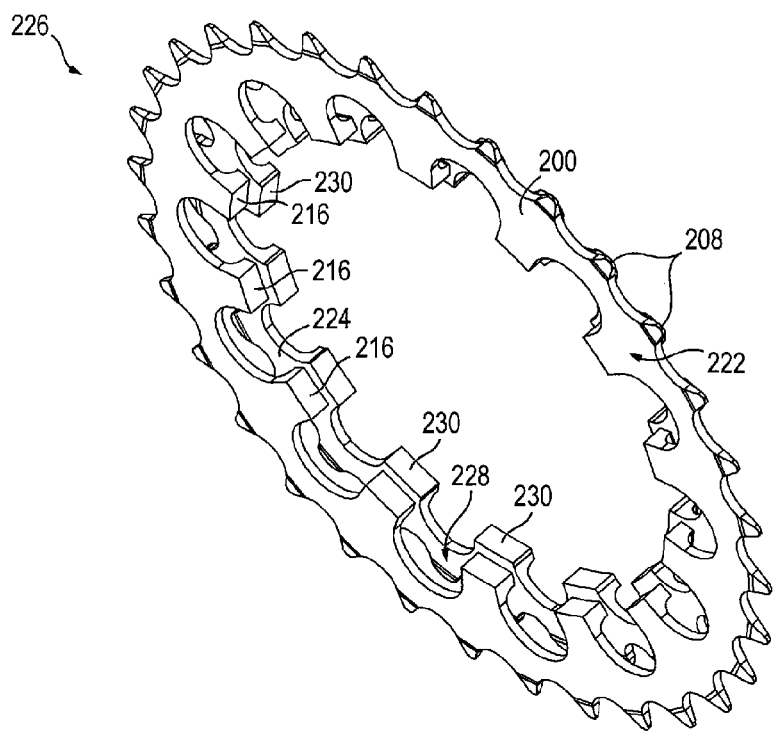
FIG. 11 is an isometric view of another illustrative intermediate article of manufacture from a step of the method shown in FIG. 6.

At step 108, sprocket portion 200 is affixed to another sprocket portion 224 to form a unitary structure 226, as shown in FIG. 11. Sprocket portions 200 and 224 may be referred to as the first sprocket portion and the second sprocket portion, respectively. In the example shown in the drawings, sprocket portion 224 may include any suitable sprocket portion substantially similar to sprocket portion 200 (described above). In other examples, sprocket portion 224 may include a standard sprocket or a sprocket portion otherwise configured to couple directly to the hub, or may comprise a cassette or portion of a cassette. As compared to sprocket portion 200, second sprocket portion 224 may have different dimensions or alternative characteristics. For example, second sprocket portion 224 may have a larger or smaller OD (a smaller OD is shown in FIG. 11). For example, second sprocket portion 224 may have a different number of teeth on the OD. For example, the first sprocket portion may include a greater tooth count than the second sprocket portion. For example, second sprocket portion 224 may have a different thickness, a different number of fingers or connector portions, and/or a differently-sized ID.

Sprocket portions 200 and 224 may be permanently connected or joined, such as by fusing connector portions 216 of first sprocket portion 200 to a major face 228 of second sprocket portion 224. Any suitable fusing method may be used. For example, step 108 may include welding (e.g., laser beam welding). After step 108, the first and second sprocket portions will be permanently attached, forming a single unitary structure 226. In some examples, such as the one depicted in FIG. 11, the two sprocket portions may be coaxial. In some examples, connector portions may extend in an opposite direction, and connector portions 230 of second sprocket 224 may be joined to face 220 of the first sprocket portion. In some examples, connector portions of a given sprocket portion may extend in more than one direction (i.e., some in one direction and some in an opposite direction). In those examples, the connector portions of the same sprocket portion can be fused (e.g., welded) or otherwise joined to two neighboring sprocket portions.

Depending on the number and location of the connector portions, it may be possible to connect the first and second sprocket portions to each other in one of a plurality of possible mutual orientations. For example, connector portions of sprocket portion 200 may be attached to sprocket portion 224 near the bases of connector portions or fingers on the second sprocket portion.

Second sprocket portion 224 may be manufactured by following one or more of the preceding steps described above. In some embodiments, as indicated by step 110, the first and/or second sprocket portion may be selected from one or more sprocket portions already manufactured or otherwise provided. Second sprocket portion 224 may be in the same state of manufacture as is the first sprocket portion at this step, meaning second sprocket portion may have profiled teeth and shaped connector portions. In some examples, one or more steps may be performed with respect to the second sprocket portion after the two sprocket portions are connected. For example, profiling and/or trimming of the teeth of sprocket portion 224 may be performed after welding.

In some embodiments, step 108 may be summarized as joining a first sprocket portion to a second sprocket portion by fusing a plurality of connector portions to the second sprocket portion. The first sprocket portion and the second sprocket portion are concentric, and the first sprocket portion is spaced from the second sprocket by the plurality of connector portions. In some embodiments, step 108 may be summarized as joining a first generally planar sprocket portion having a plurality of connector portions each unitary with the first sprocket portion and extending transverse to the plane of the first sprocket portion, to a second generally planar sprocket portion by fusing at least one of the connector portions to the second sprocket portion. The first sprocket portion is generally annular and has a first inner diameter (ID) and the second sprocket portion is generally annular and has a second ID sized differently from the first ID.

At step 112, one or more additional sprocket portions may be connected to unitary structure 226 to form a larger unitary structure. Additional sprocket portions may be obtained through step 110 and/or through one or more of steps 102-106, as described above regarding second sprocket portion 224. Additional sprocket portions may be substantially similar to portions 200 and 224, and may be of a different size and/or tooth count. For example, a third sprocket portion may be attached to face 222 of sprocket portion 200. For example, a smaller sprocket portion may be attached to the connector portions of sprocket portion 224. Accordingly, a series of sprocket portions may be so connected to form a single unitary structure 226', such as cassette 18 shown in FIG. 5. Because the cassette is unitary in nature, only a subset of the sprocket portions of the cassette need to be coupled to hub 14. For example, only a smallest sprocket portion or the two smallest sprocket portions may have a splined or keyed interface with splined portion 32 of hub 14. In some examples, a sprocket portion other than the smallest may be used. For example, one or more sprocket portions of intermediate size in cassette 18 may be coupled to the hub. In some examples, as described above, additional sprocket portions other than those of cassette 18 may be coupled to the same splined portion 32. Cassette 18 and/or additional sprockets may be held axially to the hub by a threaded keeper or any suitable structure or device configured to prevent cassette 18 from axially detaching from the hub.

Additional Illustrative Wheel Assemblies:

This section describes additional illustrative wheel assemblies similar to bicycle wheel assembly 10; see FIGS. 12-18.

FIGS. 12-18 show various aspects and examples of wheel assemblies having hollow or partially hollow cassettes with stepped sprocket portions, and spoke arrangements that extend into the cassettes. As described above, a cassette having an open cavity at a large end may facilitate more acute spoke angles (see, e.g., spoke angle 54 of FIG. 4). For example, the cassette may allow the spoke connection flange of a hub to be disposed such that the cassette-side spokes extend at least partially into the mouth of the cavity. Accordingly, wheel assemblies having hubs and cassettes constructed in accordance with aspects of the present disclosure may include spokes having a wider lateral spread than standard wheels. This section describes two additional examples of such wheel assemblies. As mentioned above, the structures, components, functionalities, and/or variations described with respect to each of these examples may be interchangeable with or included in other wheel assemblies or cassettes described herein. Additionally, certain aspects of these examples may be utilized in or produced by a related manufacturing method, e.g., method 100.

Figure 12:
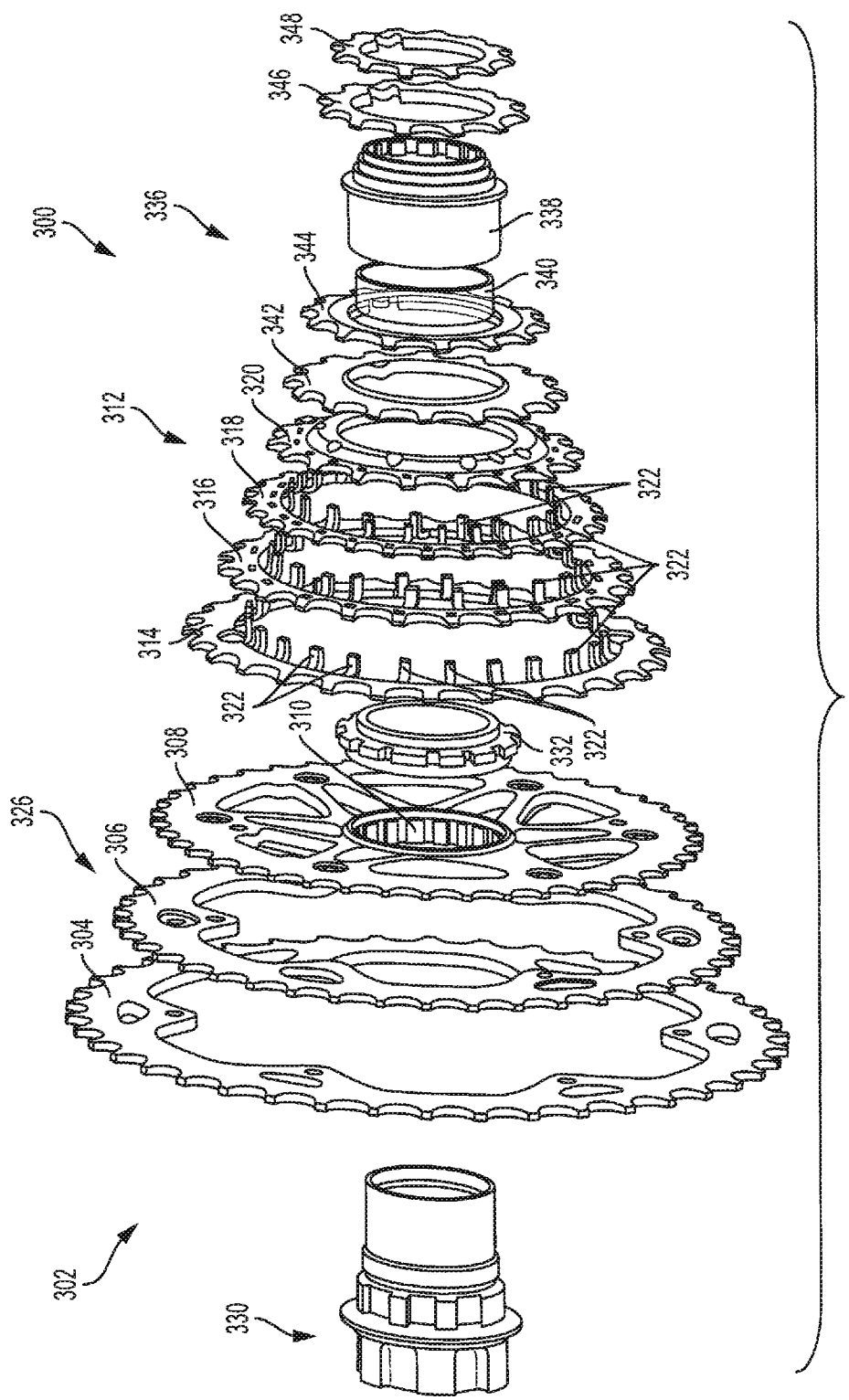
FIG. 12 is an isometric exploded view of another illustrative sprocket cluster in accordance with aspects of the present disclosure.
Figure 13:
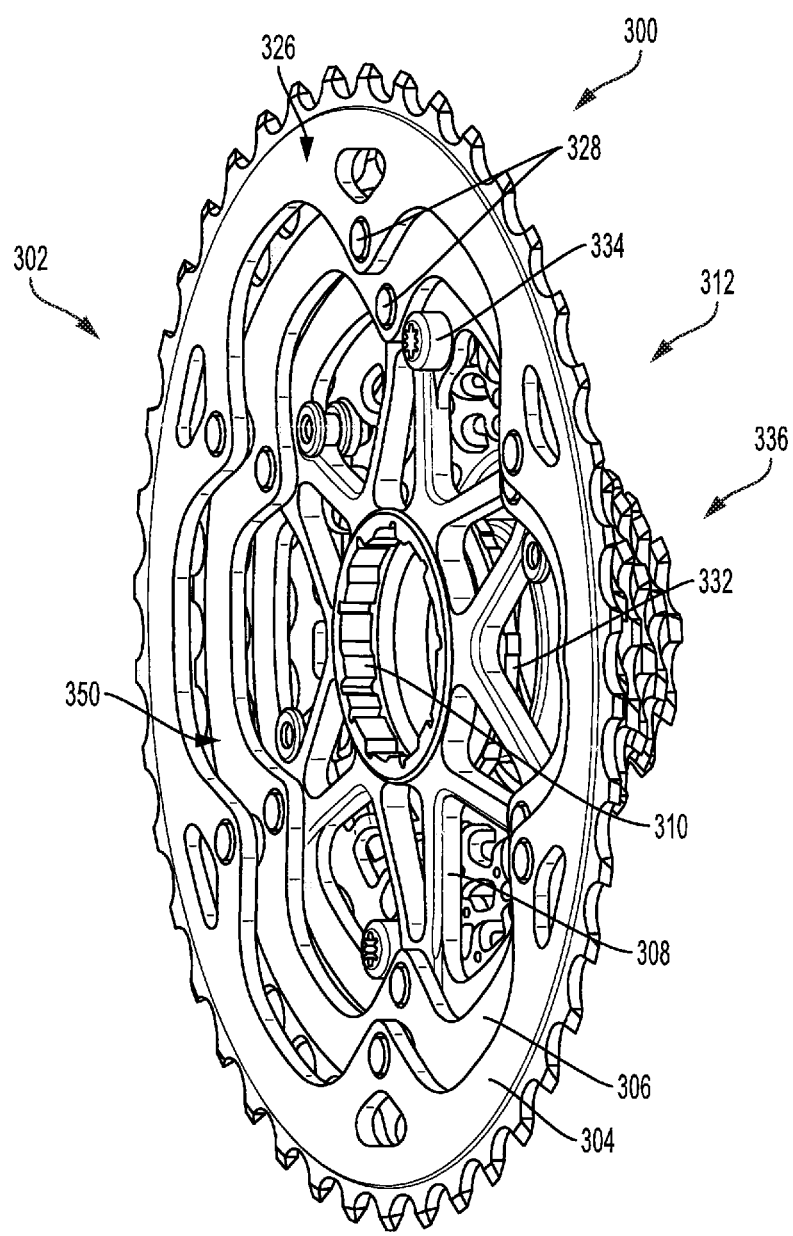
FIG. 13 is an isometric view of the assembled sprocket cluster of FIG. 12.

FIG. 12 is an exploded view of a cassette 300 and related components suitable for use in a wheel assembly similar to assembly 10 described above and/or assembly 400 described below. FIG. 13 is an assembled view of cassette 300. As with cassette 18, a plurality of annular sprocket portions is used to form an open-mouthed cavity in the large end of the cassette. Here, a large end 302 of cassette 300 includes an annular first sprocket portion 304, an annular second sprocket portion 306, and a third sprocket portion 308 having a central spline feature 310.

Figure 14:
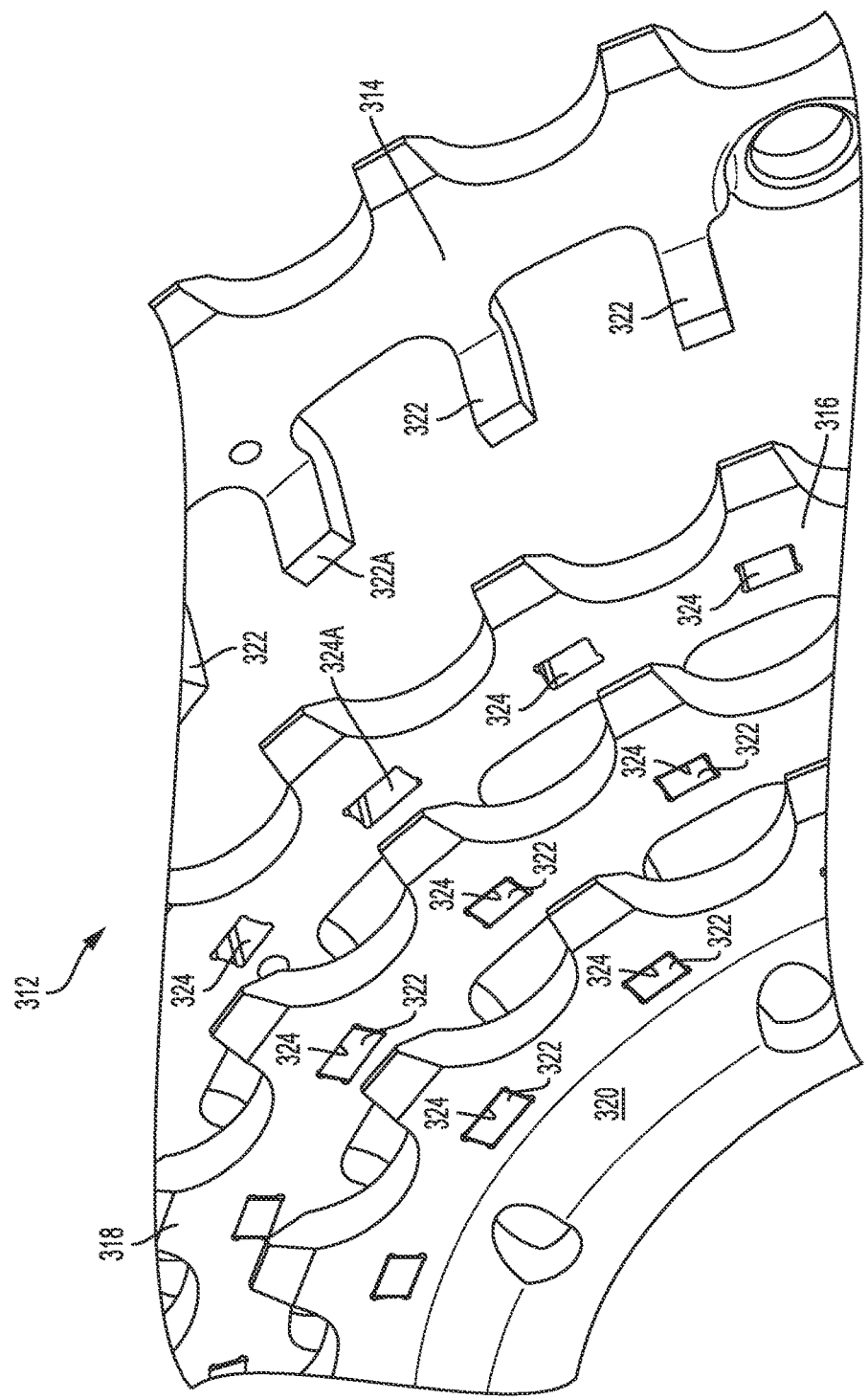
FIG. 14 is a magnified partial view of a portion of the sprocket cluster of FIG. 12, showing relationships between certain sprocket components.

A subassembly (also referred to as a cluster or subcluster) 312 of the cassette includes a fourth sprocket portion 314, a fifth sprocket portion 316, a sixth sprocket portion 318, and a seventh sprocket portion 320. Sprocket portions 314, 316, and 318 each have a plurality of connector members 322 for attaching the respective sprocket portion to the next smaller (adjacent) sprocket portion. For example, sprocket portions 314 through 320 (or a subset thereof) may be fused, e.g., welded, together using connector members 322 according to method 100. FIG. 14 is a magnified view of subassembly 312, showing how, in this example, connector members 322 of sprocket portions 314 through 318 are insertable into corresponding apertures 324 of sprocket portions 316 through 320, respectively. After inserting members 322 into apertures 324, the members may be welded in place. This plug-and-socket topology may enable added security over welding such members to a face of the adjacent sprocket portion.

Additionally, one or more connector members 322 and apertures 324 may be keyed or differently sized, to visually indicate and/or physically necessitate a proper alignment between the sprocket portions. For example, as shown in FIG. 14, one connector member 322A may be larger than the rest, and may have a correspondingly sized aperture 324A, such that sprocket portions 314 and 316 are rotationally aligned only when member 322A is inserted in aperture 324A.

Returning to FIGS. 12 and 13, a subcluster 326 including sprocket portions 304, 306, and 308 may be pinned or otherwise held together, such as by one or more removable fasteners 328 (see FIG. 13). Subcluster 326 may be attachable to a cassette driver 330 of a hub, e.g., using a lockring 332. Subcluster 312 may be attached to subcluster 326 using one or more removable fasteners 334. For example, sprocket portion 314 of subcluster 312 may be bolted to sprocket portion 308 of subcluster 326, through threaded apertures in one or both of the sprocket portions.

At the small, or outboard, end of cassette 300, a third subcluster 336 of smaller sprocket portions may be assembled onto a splined sleeve 338 and/or spacer 340. For example, an eighth sprocket portion 342, a ninth sprocket portion 344, a tenth sprocket portion 346, and an eleventh sprocket portion 348 may be keyed or otherwise coupled to sleeve 338, which is in turn connectable to the hub.

As best viewed in FIG. 13, subcluster 326 forms an open-mouthed cavity or recess 350 in large end 302 of cassette 300. Sprocket portions 304 and 306 are each annular, having an inner diameter larger than the diameter of the hub. Accordingly, a first plane defined by the inboard face of sprocket portion 304 will be spaced from a second plane defined by sprocket 308. The depth of this space (i.e., cavity or recess 350) will correspond to the thickness of the two inboard sprockets. As shown in FIG. 4 (and later in FIG. 18), this cavity can receive the cassette-side spokes, and in some examples the spoke connection flange of a hub assembly, thereby facilitating more acute spread angles for the spokes of a wheel. In other words, the spokes can break the first plane and be disposed at least partially within cavity 350.

Although eleven sprocket portions grouped into three subcluster types are described in this example, any suitable number of sprockets may be utilized and combined in any suitable number of subclusters. In some examples, more or fewer sprockets may be present, as well as more or fewer subcluster types. In some examples, one or more of the subcluster types may be absent, or arranged in a different order.

FIGS. 15-18 depict various aspects of another illustrative cassette and wheel assembly 400. Wheel assembly 400 includes a cassette 402, a hub 404, and a wheel (partially shown) having a plurality of spokes 406.

Figure 15:
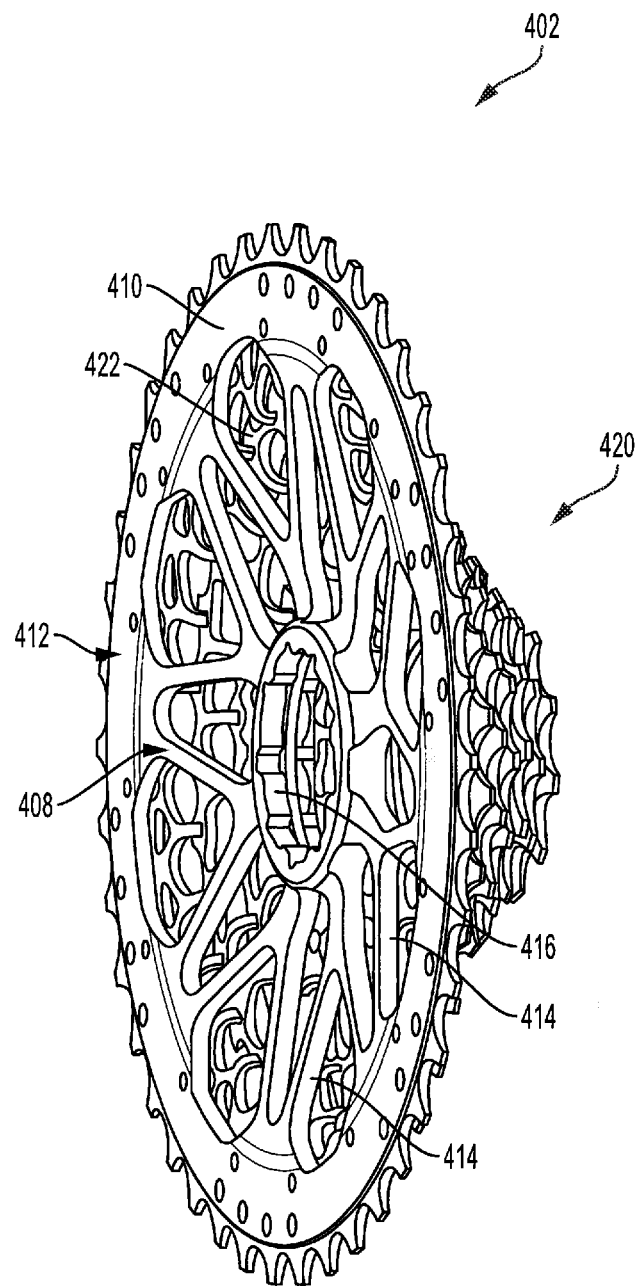
FIG. 15 is an isometric view of another illustrative sprocket cluster in accordance with aspects of the present disclosure.
Figure 16:
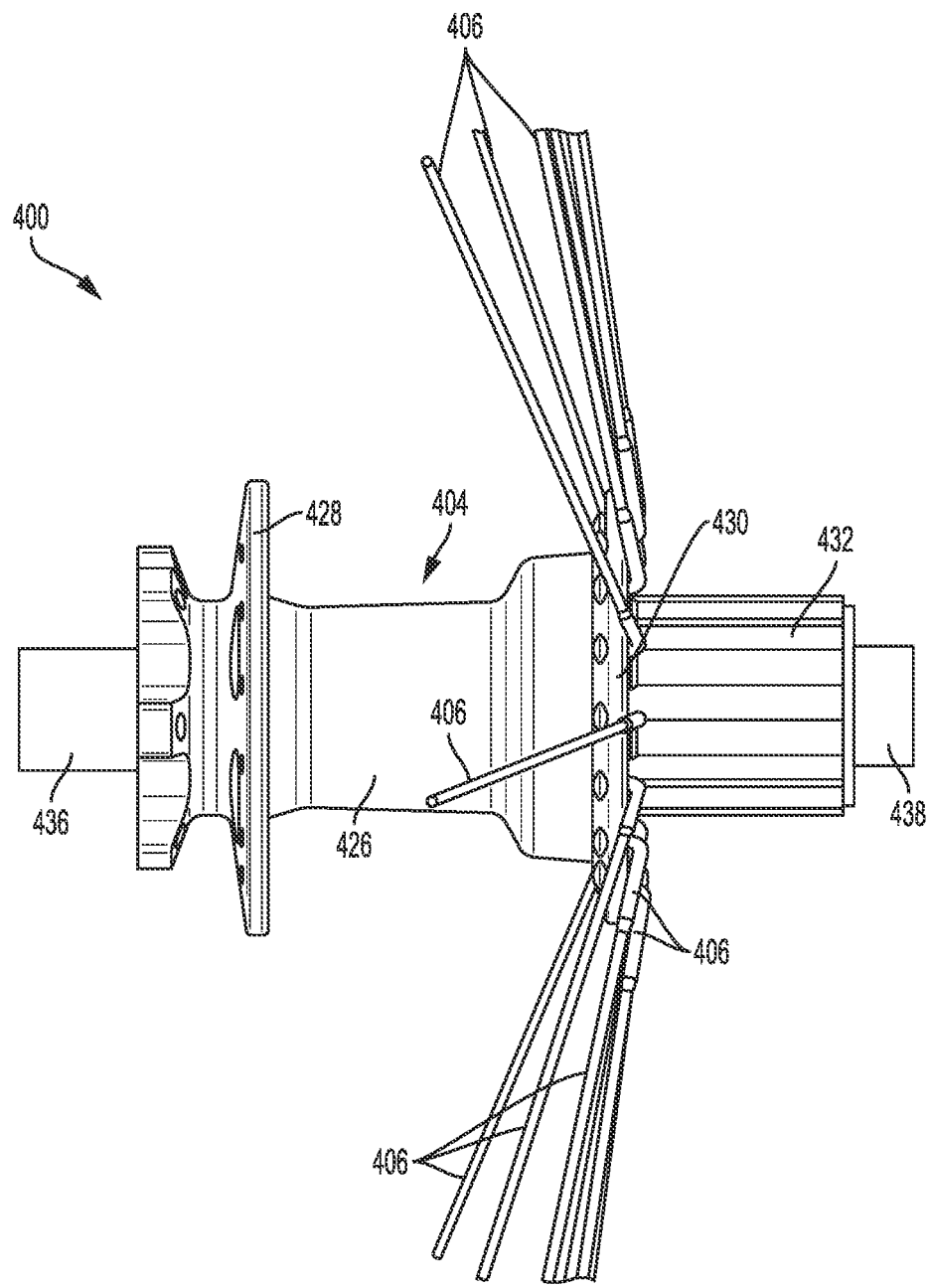
FIG. 16 is a partial rear elevation view of an illustrative bicycle wheel, showing relationships between a hub and spokes.
Figure 17:
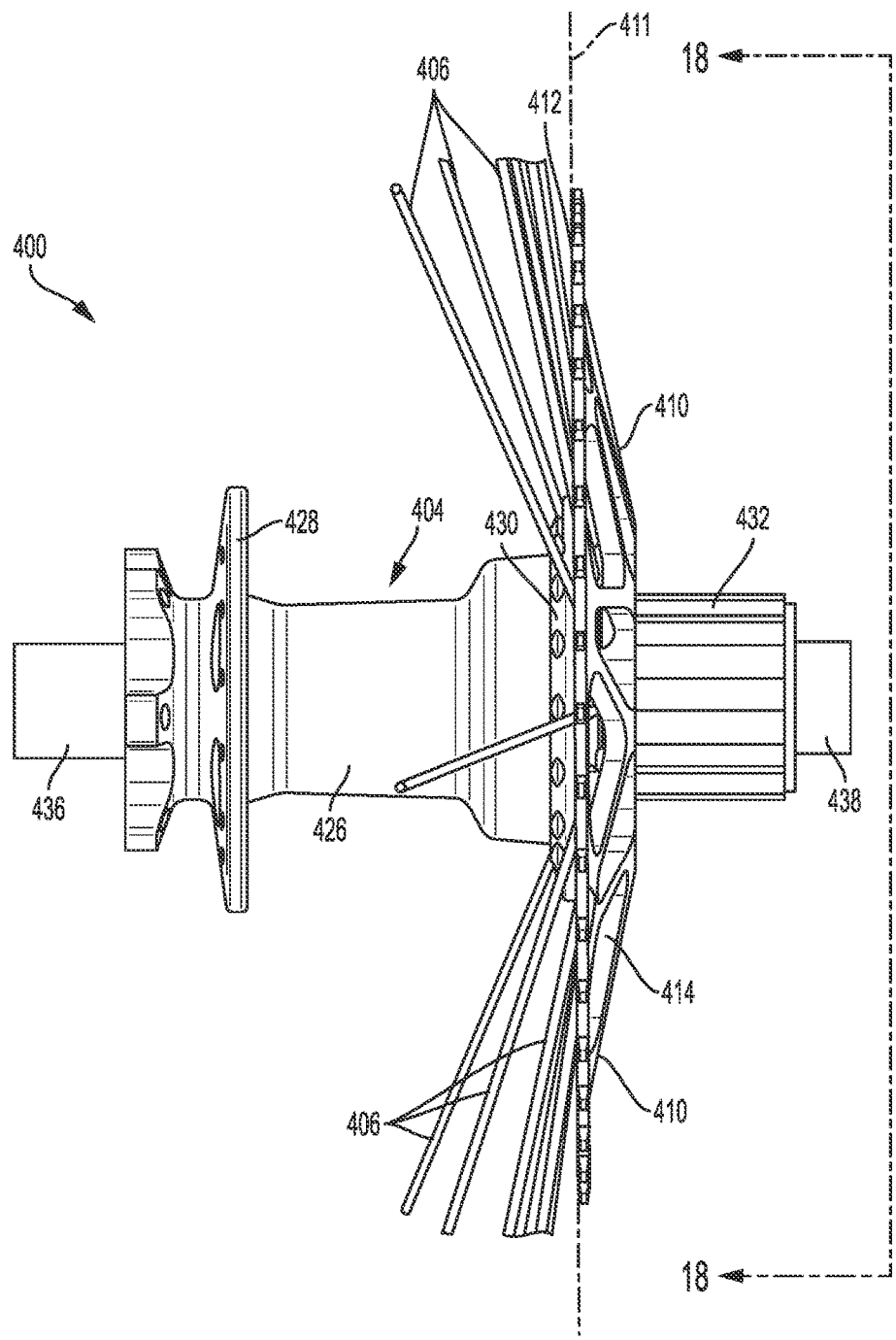
FIG. 17 shows the hub and spokes of FIG. 16, with an illustrative concave sprocket installed thereon.
Figure 18:
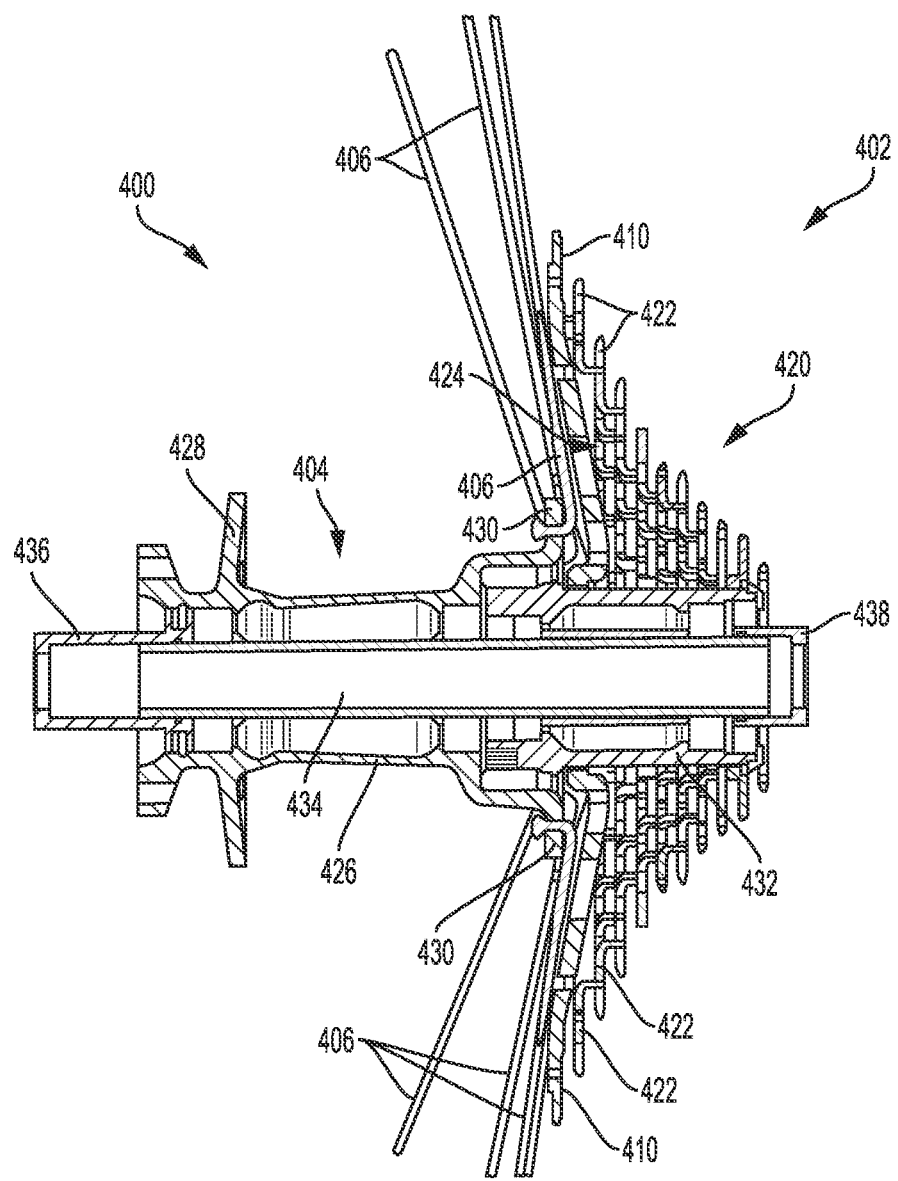
FIG. 18 is a sectional view of the assembly of FIG. 17, with additional smaller sprockets installed.

FIG. 15 is an isometric view of a cassette 402 of wheel assembly 400. FIG. 16 is a rear elevation view of hub 404 and spokes 406. FIG. 17 is a rear elevation view similar to FIG. 16, but with a single sprocket portion of cassette 402 installed. FIG. 18 is a sectional rear elevation view taken at line 18-18, with all sprockets of cassette 402 installed.

As with cassettes 18 and 300, cassette 402 defines an open cavity 408 into which spokes 406 may extend. Rather than including a number of annular sprocket portions having stepped inner diameters (IDs), as shown in the examples of cassettes 18 and 300, cassette 402 includes a first sprocket portion 410 that is concave. In other words, sprocket portion 410 curves inward, being sunken or depressed with respect to an end plane 411 defined by a periphery 412 of the sprocket (see FIG. 17). A plurality of radial arms 414 connect periphery 412 to a central spline feature 416 configured to form a keyed or splined joint with hub 404. As with cassettes described above, this arrangement allows connection between the hub and the cassette, while permitting a spoke connection flange to be located such that associated spokes are disposed at least partially within cavity 408. In some examples, the spoke connection flange may be itself partially or completely within cavity 408. In other examples, the spoke connection flange may merely be positioned such that the spokes break end plane 411 of the cassette.

Additional sprocket portions 420 may be included in cassette 402. Sprocket portions 420 may be connected to concave sprocket portion 410 by any suitable method, including those described above with respect to cassette 300. For example, a pair of annular sprocket portions 422 may be welded together, forming a central opening 424. Concave sprocket portion 410 may be adjacent to the pair of annular sprocket portions 422, such that the concave sprocket portion is disposed partially within the central opening. Additional sprocket portions may be welded or otherwise affixed to the pair just described. Concave sprocket portion 410 may be bolted or otherwise fastened to pair 422 or any other adjacent sprocket portion(s).

As depicted in FIG. 16, hub 404 includes a central body 426 (also referred to as a shell), a first or left spoke connection flange 428, a second or right or cassette-side spoke connection flange 430 spaced from the first flange, and a freehub body 432 coupled to the hub adjacent to second flange 430. As best viewed in FIG. 18, hub 404 also includes or is associated with a wheel axle 434 and a pair of opposing end caps 436 and 438.

As depicted in FIGS. 16-18, cassette-side spokes 406 are installed through corresponding apertures in flange 430, and extend from an outboard (e.g., right) face or side of the flange to a rim of the wheel (not shown, see rim of FIGS. 1-4). Spokes 406 are substantially similar to spokes 50, described above. A second set of spokes (not shown here) connects the rim to first flange 428 (see FIGS. 1-4).

As depicted in FIGS. 17 and 18, concave sprocket portion 410 is installed on hub 404. More specifically, central splined feature 416 of sprocket portion 410 is keyed or mated to a corresponding outer surface of freehub body 432. Concave sprocket portion 410 and hub 404 are configured such that spokes 406 nest within cavity 408 formed by the concave shape of the sprocket portion. In other words, sprocket portion 410 covers or overlaps a portion of the spoke connection flange and spokes, when viewed from the front or rear of the wheel assembly. Specifically, cassette 402 and flange 430 are disposed such that spokes 406 break the end plane (411) of the cassette. This is evident, for example, in FIG. 17, where an outboard portion of spokes 406 (and flange 404) are covered by sprocket portion 410. This is also evident in FIG. 18, where the spatial relationship between spokes 406, flange 404, and sprocket portion 410 is illustrated directly.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the invention (s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method for making a cassette for a bicycle, the method comprising:
    forming a generally planar and annular first sprocket portion defining a plane;
    forming a plurality of connector portions around a first inner diameter (ID) of the first sprocket portion, each of the connector portions being formed of a single piece with the first sprocket portion and extending transverse to the plane of the first sprocket portion; and
    joining the first sprocket portion to a second generally planar sprocket portion by affixing at least one of the connector portions to the second sprocket portion;
    wherein the second sprocket portion is generally annular and has a second inner diameter sized differently from the first inner diameter.

2. The method of claim 1, wherein forming the first sprocket portion includes stamping a blank of the first sprocket portion from a metal plate.

3. The method of claim 1, wherein affixing the at least one connector portion to the second sprocket portion includes coalescing.

4. The method of claim 3, wherein affixing the at least one connector portion to the second sprocket portion includes welding.

5. The method of claim 1, wherein the first sprocket portion has a first plurality of teeth spaced about a first outer diameter (OD), and the second sprocket portion has a second plurality of teeth spaced about a second outer diameter, the second outer diameter being sized differently from the first outer diameter and each tooth in the first and second pluralities of teeth being substantially identical.

6. A method for making a cassette for a bicycle, the method comprising:
    producing a substantially planar first sprocket portion defining a plane and having a generally annular shape, a first plurality of teeth extending radially outward around a first outer diameter, and a first plurality of connector portions protruding transverse to the plane of the first sprocket portion around an inner diameter, wherein the first sprocket portion and the first plurality of connector portions are a formed as a single piece;

producing a substantially planar second sprocket portion having a second plurality of teeth extending radially outward around a second outer diameter; and joining the first sprocket portion to the second sprocket portion by affixing the plurality of connector portions to the second sprocket portion;

wherein the first sprocket portion and the second sprocket portion are concentric, and the first sprocket portion is spaced from the second sprocket by the plurality of connector portions.

7. The method of claim 6, wherein affixing the plurality of connector portions to the second sprocket portion includes welding at least one of the first plurality of connector portions to the second sprocket portion.

8. The method of claim 6, further including forming a profile on each of the first plurality of teeth.

9. The method of claim 8, wherein forming the profile on each of the first plurality of teeth includes forging each tooth of the first plurality of teeth.

10. The method of claim 6, wherein producing the first sprocket portion includes stamping a blank of the first sprocket portion from a metal plate.

11. The method of claim 6, wherein the first outer diameter is sized differently from the second outer diameter.

12. The method of claim 6, wherein the second sprocket portion includes a central aperture configured to couple the second sprocket portion to a bicycle wheel hub, and wherein the inner diameter of the first sprocket portion is generally larger than a diameter of the central aperture.

13. The method of claim 12, wherein the central aperture is configured to mate with a splined freehub.

14. A method for making a cassette for a bicycle, the method comprising:

selecting a substantially planar and annular first sprocket portion defining a plane, the first sprocket portion having a first outer diameter, and a first plurality of connection members disposed around an inner diameter, the first sprocket portion and the first plurality of connection members formed as a single piece, each connection member protruding transverse to the plane of the sprocket portion;

selecting a substantially planar second sprocket portion having a second outer diameter different from the first outer diameter;

aligning the first and second sprocket portions coaxially; and joining the first and second sprocket portions by welding the first connection members of the first sprocket portion to the second sprocket portion.

15. The method of claim 14, the first sprocket portion further including a plurality of teeth spaced around the first outer diameter.

16. The method of claim 15, wherein selecting the first sprocket portion includes selecting based on a desired number of teeth.

17. The method of claim 14, further comprising:

selecting a substantially planar and annular third sprocket portion having a third outer diameter different from the first and second outer diameters, and a second plurality of connection members protruding transverse to the plane of the third sprocket portion, the third sprocket portion and the second plurality of connection members being formed as a single piece; and joining the first and third sprocket portions by welding the second connection members of the third sprocket portion to the first sprocket portion.

18. The method of claim 17, wherein an inner diameter of the third sprocket portion is larger than the inner diameter of the first sprocket portion.

* * * * *